United States Patent
Kurtz et al.

(10) Patent No.: US 7,584,131 B1
(45) Date of Patent: Sep. 1, 2009

(54) METHOD FOR MIGRATING FINANCIAL AND INDICATIVE PLAN DATA BETWEEN COMPUTERIZED RECORD KEEPING SYSTEMS WITHOUT A BLACKOUT PERIOD

(75) Inventors: Thomas Harold Kurtz, Lakeville, MN (US); Brian Theodore Simonson, Isle, MN (US); John William Borgstrom, Roberts, WI (US); Timothy J. Dubbs, Vadnais Heights, MN (US); Edward Newman, Minneapolis, MN (US); Claire Mary Berrett, Wayzata, MN (US); Pamela Jean Higgins, Cottage Grove, MN (US); Karen Ingrid Omtvedt, Golden Valley, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 1575 days.

(21) Appl. No.: 10/209,558

(22) Filed: Jul. 31, 2002

(51) Int. Cl.
  *H04L 12/00* (2006.01)
(52) U.S. Cl. ..................... 705/36 R; 707/204
(58) Field of Classification Search ............... 705/36 R; 707/200, 202–204
  See application file for complete search history.

(56) References Cited

U.S. PATENT DOCUMENTS

| | | | |
|---|---|---|---|
| 5,276,867 A | 1/1994 | Kenley et al. |
| 5,408,649 A | 4/1995 | Beshears et al. |
| 5,517,406 A | 5/1996 | Harris et al. |
| 5,671,357 A | 9/1997 | Humblet et al. |
| 5,680,640 A | 10/1997 | Ofek et al. |
| 5,734,810 A | 3/1998 | Tanaka et al. |
| 5,754,980 A | 5/1998 | Anderson et al. |
| 5,774,660 A | 6/1998 | Brendel et al. |
| 5,819,263 A | 10/1998 | Bromley et al. |
| 5,875,437 A | 2/1999 | Atkins |
| 5,911,136 A | 6/1999 | Atkins |
| 5,918,218 A | 6/1999 | Harris et al. |
| 5,930,806 A | 7/1999 | Taira et al. |
| 5,999,918 A | 12/1999 | Williams et al. |
| 6,012,044 A | 1/2000 | Maggioncalda et al. |

(Continued)

OTHER PUBLICATIONS

Klein, Al, Inform, v13,n8, pp. 14-18, Sep./Oct. 1999, "Data Migration-Issues and Strategies."*

(Continued)

*Primary Examiner*—Charles R Kyle
*Assistant Examiner*—Seth Weis
(74) *Attorney, Agent, or Firm*—Snell & Wilmer L.L.P.

(57) ABSTRACT

There is provided a no-blackout migration process for migrating plans between record keeping systems with continuous and uninterrupted client and participant access to the plans being migrated comprising the steps of: moving a plan to a staging data storage, extracting plan data, converting a financial data subset, converting all extracted plan data to converted plan data having a second format, transmitting the converted plan data to a second system data storage and loading to a second system data storage wherein the majority of the converted plan data loaded into the second system data storage is loaded through execution of a bulk copy program, executing post-import comparisons and auto-reconciliation jobs and executing a correction process if the second plan does not correspond to the selected plan in the first system, activating the second plan and deactivating the original plan, and migrating and loading pending transactions into the second data storage.

23 Claims, 3 Drawing Sheets

U.S. PATENT DOCUMENTS

| | | | |
|---|---|---|---|
| 6,014,642 | A | 1/2000 | El-Kadi et al. |
| 6,041,313 | A | 3/2000 | Gilbert et al. |
| 6,049,782 | A | 4/2000 | Gottesman et al. |
| 6,064,986 | A | 5/2000 | Edelman |
| 6,138,159 | A | 10/2000 | Phaal |
| 6,145,066 | A | 11/2000 | Atkin |
| 6,145,094 | A | 11/2000 | Shirriff et al. |
| 6,157,932 | A * | 12/2000 | Klein et al. ............... 707/204 |
| 6,167,427 | A | 12/2000 | Rabinovich et al. |
| 6,182,122 | B1 | 1/2001 | Berstis |
| 6,235,176 | B1 | 5/2001 | Schoen et al. |
| 6,269,382 | B1 | 7/2001 | Cabrera et al. |
| 6,275,814 | B1 | 8/2001 | Giansante et al. |
| 6,327,622 | B1 | 12/2001 | Jindal et al. |
| 6,338,047 | B1 | 1/2002 | Wallman |
| 6,345,316 | B1 | 2/2002 | Chessell et al. |
| 6,354,490 | B1 | 3/2002 | Weiss et al. |
| 6,356,977 | B2 | 3/2002 | Ofek et al. |
| 6,366,558 | B1 | 4/2002 | Howes et al. |
| 6,405,294 | B1 * | 6/2002 | Hayter ....................... 711/162 |
| 6,957,251 | B2 * | 10/2005 | Wisner et al. ............... 709/220 |
| 2002/0069077 | A1 * | 6/2002 | Brophy et al. ................. 705/1 |

OTHER PUBLICATIONS

PR Newswire, "Wachovia to offer two way wireless retail and commercial financial services using 724 Solutions Software," Jul. 10, 2000.*

Business Wire, "HP enhances its high availability solution for HP netserver system environments," Jun. 5, 2000.*

* cited by examiner

METHOD FOR MIGRATING FINANCIAL AND INDICATIVE PLAN DATA BETWEEN COMPUTERIZED RECORD KEEPING SYSTEMS WITHOUT A BLACKOUT PERIOD

FIELD OF THE INVENTION

The present invention relates generally to computerized data processing systems in the field of financial and trust services. More particularly, the present invention relates to methods for migrating plans, such as employee benefit plans, data, records and information between computerized record keeping systems without a blackout period for the client or plan participants.

BACKGROUND OF THE INVENTION

Computerized record keeping systems are well known in the financial and business community. In the field of financial and trust services, computerized record keeping systems are used extensively by many well-known providers, e.g., Fidelity Investments, T. Rowe Price, Vanguard, etc. Providers or Plan Sponsors typically provide their services and products to corporations, partnerships, sole proprietorships, and unions along with their employees and members, or participants.

Plan Sponsors offer 401(k) plans or other employee benefit plans to their employees for many reasons, including, for example, to attract and retain employees. Employee benefit plans offer employees a variety of benefits. These include a flexible way to save for retirement, current federal income tax savings on before-tax contributions, and tax-deferred retirement savings growth potential. Plan Sponsors engage service providers for a number of reasons, including because Plan Sponsors often do not have the expertise or internal resources to administer employee benefit plans. Service providers offer many products and services to Plan Sponsors, which may include providing, maintaining and supporting computerized record keeping systems for administering plans.

Typically, a plan is a composite of individual employee or participant data from a single Plan Sponsor, along with plan parameters, or collectively, plan data. Participant data is generally the whole record or file for an individual within a particular plan. The participant data includes indicative data such as name, Social Security number, birth date, and address, along with financial data such as current account balance information, investment fund information, etc. The plan parameters reflect plan provisions such as vesting, contribution, and eligibility provisions, along with administrative features such as investment fund options.

Typically, the record keeping systems used by service providers are computerized systems comprised of preferred computer or machine hardware and software applications that store, manipulate and process data and output information related to plans and their participants. For example, many existing record keeping systems use computerized databases and database management systems (DBMS), including associated hardware and software (both application and system software) to manipulate the information or data. Typical data inputs include Plan Sponsor payroll data, investment fund pricing information, and participant transaction records initiated through end-user interfaces. The end-user interfaces commonly include Internet, Intranet, interactive voice response (IVR) systems, customer service representatives, and desktop computer applications. Typical data outputs generally include Plan Sponsor administrative reports, financial trades, client and operational reports, data feeds sent to Plan Sponsors, and participant statements. Other appropriate and specific data inputs or outputs may be used as desired for a particular plan.

From time to time, service providers upgrade or replace their computerized record keeping systems in an effort to provide clients with faster, more efficient, more reliable and more cost-effective systems. As service providers replace existing record keeping systems with new or updated systems, the plans on its existing system must be converted and migrated to the new system.

Existing methods for conversion and migration of plans from legacy record keeping systems to new record keeping systems, e.g., from a PlanOne record keeping system to a record keeping system that uses a WyStar platform (systems well known in the industry and to those of skill in the art) commonly result in blackout periods during the migration process for clients and participants.

A blackout period is generally understood to mean the elimination or substantial curtailment of client or participant access to their plan or account during the period that their plan is being migrated from the legacy record keeping system to the new record keeping system. This blackout period particularly curtails the participant's ability to initiate transactions such as investment fund transfers, including buys and sells of investment fund holdings, for example.

The migration process is a lengthy process that, depending on the number of plans and the amount of plan data or information in each plan being migrated, can take many hours to days to complete. In order to minimize the blackout periods that result from existing migration methods, service providers often migrate plans over weekends or on business holidays. Heretofore, plan migration on or during a given business day has not been accomplished without engendering a blackout period.

There is thus a need for a novel migration process that allows for migration of plans from a legacy record keeping system to a new record keeping system that can occur on and during business days without the concomitant blackout periods associated with existing migration processes.

SUMMARY OF THE INVENTION

The present invention provides a novel method for migrating plans from a first computerized record keeping system to a second computerized record keeping system on or during business days without a blackout period, thereby resulting in uninterrupted and continuous client and participant access to the plan. The no-blackout migration process is transparent to clients and participants, who maintain the ability to access and initiate transactions to their plans at all times during the migration.

There is provided a method of migrating plans between computerized record keeping systems while providing uninterrupted and continuous access to clients and participants in those plans. A preferred embodiment of the no-blackout migration process is comprised of the following steps. A plan's plan data is moved from an active data storage in the first record keeping system to a staging data storage also in the first record keeping system. Next, plan data from the selected plan in the staging data storage can be read and extracted, and a financial data subset of the extracted plan data can be converted from a four to three decimal representation. The extracted plan data, including the financial data subset with the new three decimal representation, can be converted to a second plan data having a format compatible with a second record keeping system. Next, the second or converted plan data can be transmitted to a data storage in the second record keeping system and loaded into a second data storage in the second record keeping system, resulting in a second plan. The second plan data is preferably loaded into the second data storage through execution of a bulk copy program or other compatible high-speed copy program.

Execution of post-import comparisons and auto-reconciliation jobs can then be carried out to verify that the converted plan data loaded into the second data storage correctly corresponds to the plan data in the selected plan in the legacy or active record keeping system. If the converted plan data imported into the second record keeping system does not correctly correspond to the selected plan data in the legacy record keeping system a correction process can be executed.

Next, the second plan in the second computerized record keeping system can be activated and the selected plan in the first computerized record keeping system can be deactivated. Thereafter, any pending transactions initiated by a client or participant prior to or during activation of the second plan, and affecting the plan data migrated from the first computerized record keeping system, are migrated and loaded to the data storage in the second computerized record keeping system. The migration and loading of the pending transactions can be done at any time after the second plan is activated. In some embodiments, the loading and migrating of the pending transactions is done upon or subsequent to the close of the stock market. If desired, the selected plan in the first record keeping system can then be moved to a migrated data storage in the first record keeping system and designated as a read-only plan. Alternatively, the selected plan in the first record keeping system could be left in place and simply deactivated.

It is an object of the present invention to facilitate the novel method or process of migration from one record keeping system to another on or during a business day without causing disruption to clients and participants who will have continuous and uninterrupted access to their plans during the migration.

It is an object of the present invention to create a no-blackout conversion or migration process.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION

Figure 1:
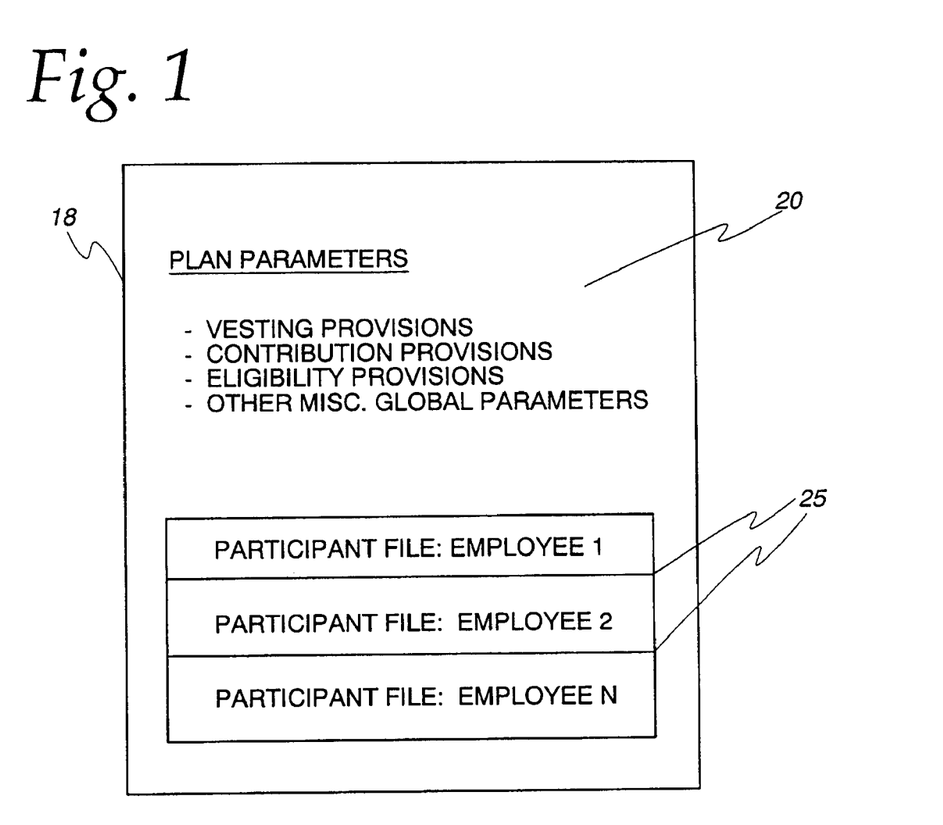
FIG. 1 depicts plan parameters.

FIG. 1 is a schematic representation of a plan 18. Each plan 18 consists of plan parameters 20 and participant files 25 that correspond to the Plan Sponsor's plan data. The plan parameters 20 include plan provisions such as vesting, contribution, and eligibility provisions, as well as plan features such as investment fund options available. The participant files 25 are the collection of individual participants in the Plan Sponsor's plan. The number of participant files 25 in a particular plan 18 will vary depending on the size of the Plan Sponsor, the number of employees eligible to participate in the plan, and the number of employees who choose to participate in the plan.

Figure 2:
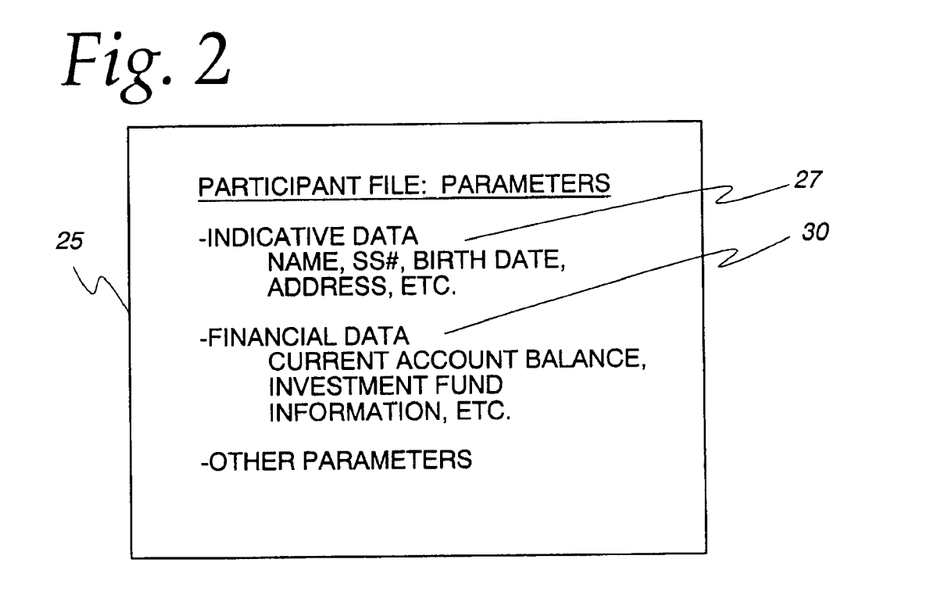
FIG. 2 depicts a participant file.

FIG. 2 illustrates an example of the participant data within a participant file 25 in plan 18. The participant file 25 is preferably the complete record or data file for one participant in the plan 18. The participant file 25 is comprised of participant data that may include indicative data 27, financial data 30 or any other data typical of a participant file 25. Indicative data 27 may include the participant's name, Social Security number, birth date, and address. Financial data 30 may include current account balance information, investment fund information, etc.

Figure 3:
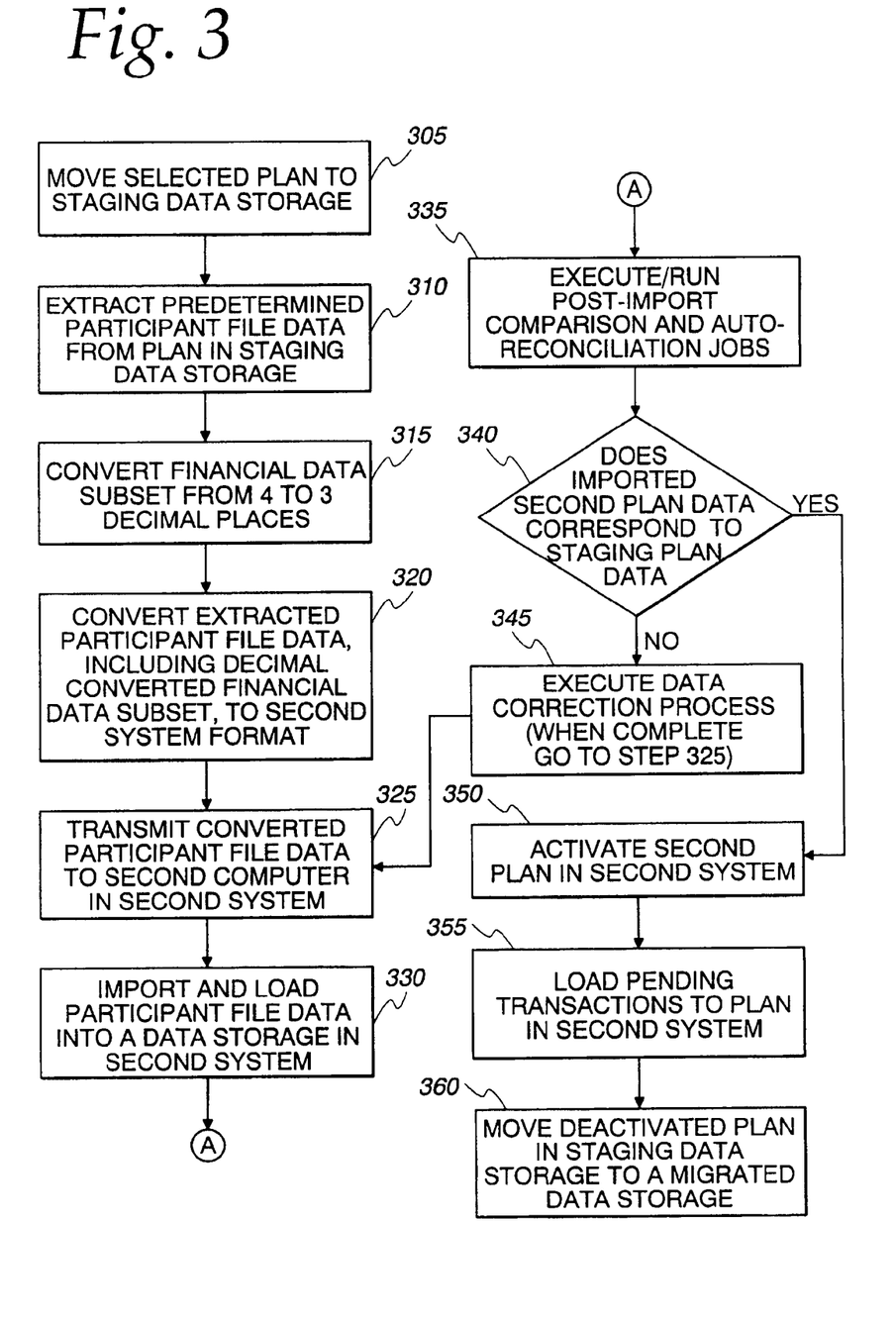
FIG. 3 depicts a flow chart of the steps that can be used in one embodiment of a no-blackout migration process.
Figure 4:
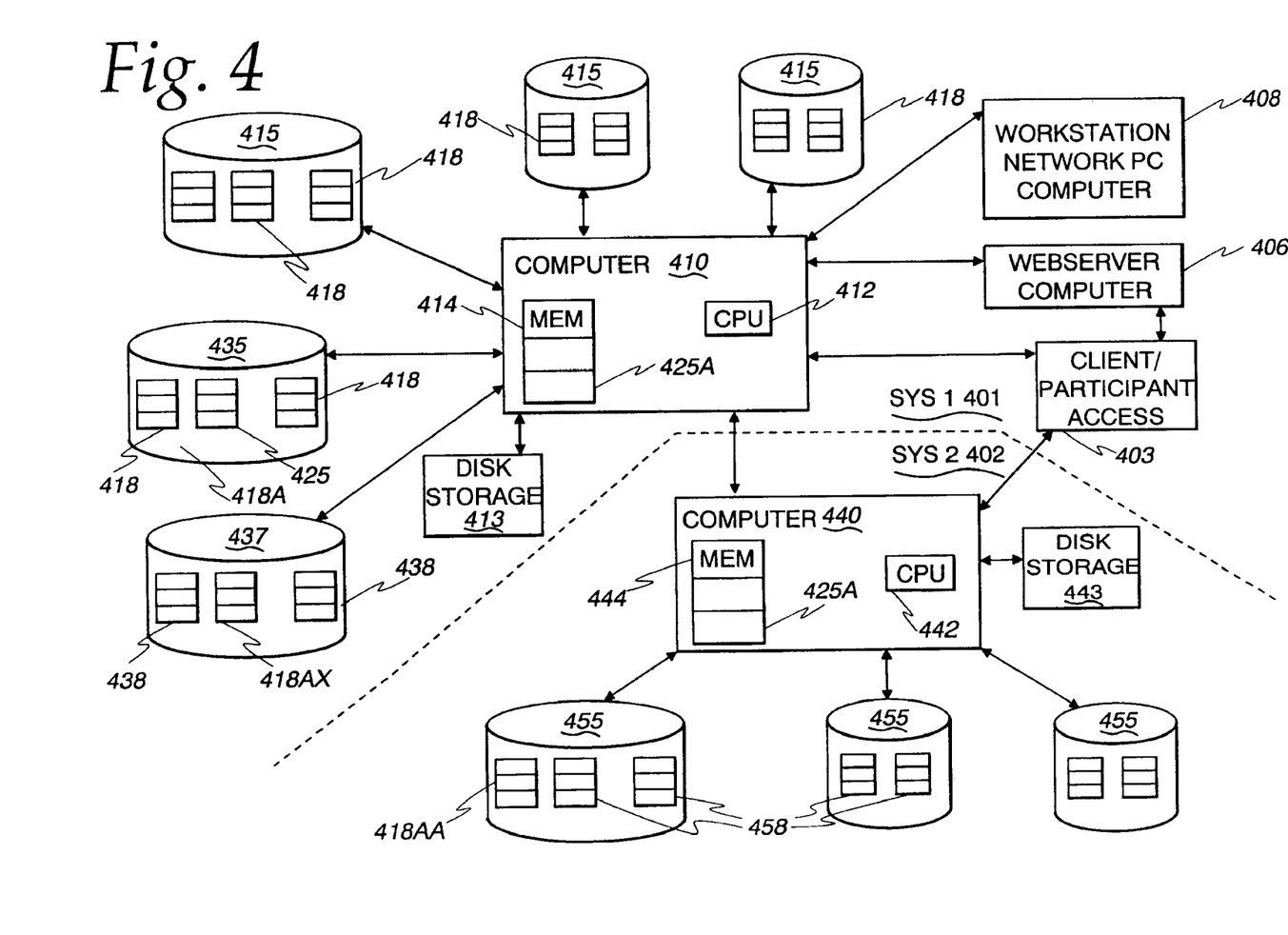
FIG. 4 is a schematic representation of a system that can implement the no-blackout migration process of FIG. 3.

FIG. 3 is a flow chart with steps for a preferred embodiment of a no-blackout migration process according to the present invention. FIG. 4 is a schematic of a system where the no-blackout migration process of FIG. 3 can be implemented. The process shown in FIG. 3 illustrates the migration of plans between record keeping systems while providing continuous and uninterrupted client and participant access to the plans, i.e., a no-blackout migration process that is transparent to clients and participants.

The embodiment of the no-blackout migration process illustrated in FIG. 3 is a preferred process for migration of one plan 418 (as shown in FIG. 4) from a first or legacy record keeping system 401 to a new or second record keeping system 402 with a new or different system format. In particular, the process below will describe the migration of a selected plan 418, labeled 418A, in the first record keeping system 401 to a second record keeping system 402 where the migrated plan is labeled 418AA. Those of skill in the art will readily recognize that this process can be carried out repeatedly to effect the migration of any number of plans 418 from the first record keeping system 401 to the second record keeping system 402. For illustrative purposes, the description will periodically refer to a plan migration from a PlanOne record keeping system 401 to a second system 402 using a WyStar platform or format and SYBASE data storage. These systems are well known systems in the industry and to those of skill in the art.

In step 305, plan 418A is moved from an active data storage 415 to a staging data storage 435. In this embodiment, the staging data storage 435 is the data storage where each plan 418 selected for migration to a new or second record keeping system is initially moved to begin the no-blackout migration process. The staging data storage 435 can store one or more plans 418 that have been selected and moved from an active data storage 415 in preparation for migration to a second record keeping system 402 format. Also, the active data storage 415 and the staging data storage 435 are preferably both in the first or legacy record keeping system 401, but can be in different physical computer systems. The initial movement to a staging data storage 435 of the plans 418 and 418A being migrated simplifies and streamlines the no-blackout migration process. Those of skill in the art will readily recognize that the plans 418 and 418A could also be migrated to the new record keeping system 402 directly from their existing or current locations in the active data storage 415.

Step 305 can be accomplished by a computer program or programs executed by a CPU 412 in a computer 410. Step 305 and subsequent steps may be accomplished in a number of ways and by one or more computers. In a preferred embodiment, the CPU 412 executes instructions to copy plan 418A into its computer memory 414 and save the plan 418A to the staging data storage 435. At this point, there are actually two copies of the plan 418A being migrated—one version in the active data storage 415 and the copied version in the staging data storage 435. The CPU 412 then executes instructions to delete the version of the plan 418A still residing in the active data storage 415. The only version of plan 418A remaining is now in the staging data storage 435.

In step 310, participant file data 425 is read and extracted from the plan 418A in the staging data storage 435. The read and extracted participant file data 425 is the associated data for every participant file 425 in the plan 418A being moved. Step 310 can be accomplished by execution of a program or programs by the CPU 412. The computer 410 can temporarily place the read and extracted participant file data 425 in its computer memory 414 or in an auxiliary disk storage 413 where the CPU 412 can access and manipulate the read and extracted participant file data 425. At this point, the plan 418A in the staging data storage 435 and the read and extracted participant file data 425 are both available to the computer 410 to continue the migration process.

The amount of data actually read and extracted for a given plan 418 will vary depending on the size of the Plan Sponsor, the number of employees eligible to participate in the plan, and the number of employees who choose to participate in the plan. For example, if Plan Sponsor X has 500 employees eligible for the plan who've chosen to participate in the plan, the data read and extracted from plan 418A would be for the 500 participants in plan 418A.

If necessary, in step 315, a financial data subset 30 (shown in FIG. 2) of the read and extracted participant file data 425 is converted from its current decimal place representation to a second decimal place representation associated with the new record keeping system 402 to which the plan 418A is being migrated. The decimal place representation of the second record keeping system 402 could be larger than, smaller than or the same as the decimal place representation of the first record keeping system. Thus, this step may be necessary only where the decimal place representations of the systems involved in the migration process are different. For example, the first record keeping system may have a four decimal representation and the new record keeping system a three decimal representation. Thus, in step 315, the computer 410 would execute a program or programs via the CPU 412 to convert the financial data subset 30 of the read and extracted participant file data 425 from four decimals places to three decimals places. At this point, the read and extracted participant file data 425 and the newly converted financial data subset 30 can be located in the computer memory 414 or an auxiliary disk storage 413. In the illustrated embodiment, the auxiliary disk storage 413 is preferably used to store the read and extracted participant file data 425 and the newly converted financial data subset 30. Those of skill in the art will readily recognize that any other storage means accessible to the CPU 412 may be used.

Next, in Step 320, the read and extracted participant file data 425 and the newly converted financial data subset 30 in the first record keeping system 401 are converted into a second participant file data 425A format or layout (e.g., from a PlanOne format to a WyStar layout) that corresponds to the new or second record keeping system 402 (e.g., a system that uses a WyStar format) to which the plan 418A is being migrated. In step 320, the computer 410 can execute a program or programs to convert read and extracted participant file data 425, including the converted financial data subset 30, into second or converted participant file data 425A corresponding to a second record keeping system 402 format or layout. At this point, the second or converted participant file data 425A is preferably located in an auxiliary disk storage 413. Again, those of skill in the art will readily recognize that any other storage means accessible to the CPU 412 may be used, e.g., the computer memory 414. At this point, the original plan 418A being migrated still resides in the staging data storage 435 with its associated participant files 425 in the format of the first record keeping system 401.

In Step 325, the converted or second participant file data 425A, which is now in the second format or layout, is transmitted to the second computerized record keeping system 402. In a preferred embodiment, the converted participant file data 425A is transmitted to a computer 440 associated with the second computerized record keeping system 402 using a file transfer protocol (FTP) utility or other compatible or suitable transmission means. The transmitted converted participant file data 425A is preferably temporarily stored on a second auxiliary disk storage 443 associated with the second computerized record keeping system 402. The transmitted converted participant file data 425A could alternatively be temporarily stored on the computer's memory 444 associated with the second computerized record keeping system 402. The computer 440 could be a WyStar server or any other appropriate computing device with sufficient storage. Those of skill in the art will readily recognize that other storage means accessible to the CPU 442 in the second record keeping system 402 may be used. Again, at this point, the particular plan 418A being migrated, with its corresponding participant files 425, still resides in the staging data storage 435 in the format of the first record keeping system 401.

Moreover, those of skill in the art will readily recognize that the computer 440 can be a separate computer or machine, as shown in FIG. 4, with associated computer memory 444, CPU 442, and auxiliary disk storage 443, or alternatively, that the computer 440 could be the same computer 410 used in the first record keeping system 401 where specific programs and software applications are executed that correspond with the second record keeping system 402.

Next, in Step 330, the converted participant file data 425A, currently in the auxiliary disk storage 443 associated with the computer 440, is imported and loaded into a second data storage 455 associated with the second record keeping system 402. For example, the converted participant file data 425A can be imported and loaded into a SYBASE data storage 455 in the appropriate WyStar formatted tables and fields.

In the preferred embodiment, as discussed above in steps 325 and 330, the converted participant file data 425A is preferably transmitted to a temporary data storage, i.e., the auxiliary disk storage 443 or computer memory 444, in the second computerized system 402 and then loaded from the temporary data storage 443 or 444 into the data storage 455 of the second record keeping system 402. However, those of skill in the art will readily recognize that steps 325 and 330 could be modified so that the converted participant file data 425A could instead be transmitted and loaded directly into the data storage 455 of the second record keeping system 402 without the need to first transfer the converted participant file data 425A to temporary data storage 443 or 444 in the second record keeping system 402.

In a preferred embodiment of the no-blackout migration process, the converted participant file data 425A is loaded onto the data storage 455 using a bulk copy program, e.g., a SYBASE bulk copy (BCP) utility. The use of the bulk copy program to load the converted participant file data 425A into the data storage 455 substantially reduces the amount of time required to load the converted participant file data 425A into the WyStar formatted tables and fields in the SYBASE data storage 455. Although a SYBASE bulk copy program is used in the embodiment discussed, those of skill in the art will recognize other high-speed copy programs could be used as well, depending on the particular first and second record keeping systems 401 and 402 involved. The use of only the WyStar loading program or any other conventional process to load the converted participant file data 425A, without the use of a bulk copy program, would take an inordinate amount of time, crossing multiple business days and complicating the object of a no-blackout migration of plans 418 and 418A. Thus, the use of the bulk copy program or any other high-speed copy program, and the resultant reduced loading time of the converted participant file data 425A, facilitate a no-blackout migration of plans 418 and 418A from the first record keeping system 401 to the second record keeping system 402 on or during regular business days.

In an alternate embodiment, the bulk copy program, e.g., a SYBASE bulk copy (BCP), could instead load only a majority of the converted participant file data 425A into the data storage 455 of the second record keeping system 402. Again, those of skill in the art will recognize other high-speed copy programs could be used. Any remaining unloaded converted participant file data 425A would then be loaded into the data storage 455 associated with the second record keeping system 402 using conventional processes.

In step 330, the computer 440 executes a program or programs, such as the bulk copy program, to load the converted participant file data 425A to data storage 455 in the second record keeping system 402. At this point, the plan 418A has been migrated to the second record keeping system 402 and now exists as a new or second plan 418AA in data storage 455 in the format or layout of the second record keeping system 402. Also at this point there still exists the original version of the plan 418A in the staging data storage 435 in the first record keeping system 401. The new or migrated plan 458, including the second plan 418AA, in the SYBASE data storage 455 in the second record keeping system 402 can be accessed, updated, changed, stored or manipulated by the computer 440 as desired. The computer 440 can be a server or larger mainframe type computer with associated computer memory 444 and CPU 442. The computer 440 of the second record keeping system 402 can manipulate the new or migrated plan 458, including the second plan 418AA, through the execution of a database management system (DBMS) program compatible with the SYBASE data storage 455. The DBMS program allows one or more users to access and manipulate data from the migrated plan 458 and second plan 418AA located in the data storage 455 of the second record keeping system 402.

In step 335, the computer 440 in the second record keeping system 402 and/or computer 410 in the first record keeping system executes post-import comparisons and auto-reconciliation jobs to verify that the second plan 418AA and its converted participant file data 425A imported into the second record keeping system 402 accurately correspond to the plan 418A data in the staging data storage 435 in the first record keeping system 401.

In step 340, the computer 440 in the second record keeping system 402 and/or computer 410 in the first record keeping system makes a determination of whether the post-import comparisons and auto-reconciliation jobs were successfully executed. Step 340 confirms or verifies that the new or second plan 418AA, with its converted participant file data 425A, accurately corresponds to selected plan 418A in the staging data storage 435 in the first record keeping system 401.

In step 345, if it is determined that the second plan 418AA with its converted participant file data 425A does not accurately correspond to plan 418A in the staging data storage 435, and manual corrections are not feasible or practical, a correction process is executed by the computer 410 in the first record keeping system 401 to modify and correct the converted participant file data 425A in the first record keeping system 401. The migration process is then preferably reentered at step 325 where the corrected second participant file data 425A is re-transmitted to the computer 440 in the second record keeping system 402. Alternatively, a correction process may be executed by the computer 440 to modify and correct the converted and transmitted plan data 425A in the second record keeping system 402.

In step 350, once the second plan 418AA in the second record keeping system 402 and the selected plan 418A in the staging data storage 435 accurately correspond, the second plan 418AA is activated and the corresponding selected plan 418A in the first computerized record keeping system 401 is deactivated. The selected plan 418A in the first record keeping system 401 is preferably deactivated simultaneously upon the activation of the second plan 418AA. However, the selected plan 418A in the first record keeping system 401 could also be deactivated at a time subsequent to activation of the second plan 418AA in the second record keeping system 402, so long as a client or participant can access only one or the other active plan 418A or 418AA.

The second plan 418AA is activated in the second record keeping system 402 by execution of an appropriate program in the computer 440 or other computer in the second record keeping system 402. Similarly, the selected plan 418A is deactivated in the first record keeping system 401 by execution of an appropriate program in the computer 410 or other computer in the first record keeping system 401. Those of skill in the art will recognize that the deactivation or activation of plans 418, 418A, and 418AA can be accomplished by computers 410 and 440 alone or in conjunction with other computers in either or both systems 401 or 402. Once a plan has been migrated to and activated in the second record keeping system 402, subsequent client and participant access will be routed to the plan in the second record keeping system 402.

In step 355, once the second plan 418AA in the second record keeping system 402 is activated and the corresponding selected plan 418A in the first record keeping system 401 is deactivated, any pending transactions effected in the selected plan 418A prior to or during activation of the second plan 418AA in the second record keeping system 402 are migrated and loaded to the second plan 418AA in the second computerized record keeping system 402. The migration and loading of the pending transactions can be done at any time after the second plan 418AA in the second record keeping system 402 is activated. In some instances, the loading and migrating of the pending transactions can be done upon or subsequent to the close of the stock market, e.g., 4:00 PM Eastern Standard Time.

Step 355 ensures that the second plan 418AA in the second record keeping system 402 is updated with the transactions initiated prior to or during the migration and prior to the deactivation of the selected plan 418A. The migration and loading of pending transactions can be accomplished by computers 410 and 440 associated with the first and second record keeping systems 401 and 402 in a manner similar to that described above with respect to the migration of a plan 418A in steps 310 through 330. The migrated pending transactions, appropriately formatted, are then processed in the second record keeping system 402.

In step 360, the original plan 418A, now deactivated and currently residing in the staging data storage 435, may be moved to a migrated data storage 437 in the first record keeping system 401. The process for moving the original plan 418A in the staging data storage 435 to the migrated data storage 437 is similar to that of moving the plan 418 from an active data storage 415 to the staging data storage 435 discussed above in step 305. The selected plan 418A, once moved to the migrated data storage 437, can be configured such that it is a read-only or inactive plan 418AX. In the embodiment shown, the migrated data storage 437 will preferably contain only deactivated plans 438 and 418AX that have been completely and successfully migrated to the second record keeping system 402. The deactivated plans 438 and 418AX may be kept in the migrated data storage 437 for archival purposes and/or to comply with record retention requirements applicable to employee benefit plans. Once a plan 418A has been moved to the migrated data storage 437, the plan 418A is removed or deleted from the staging data storage 435 to allow for subsequent plans 418 to be moved into the staging data storage 435 in preparation for migration to the second record keeping system 402.

The invention has been described and illustrated with respect to certain preferred embodiments by way of example only. Those skilled in the art will recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A method of migrating a financial plan from a first computerized system to a second computerized system comprising the steps of:
   extracting predetermined financial plan data from a selected financial plan in the first computerized system to create extracted financial plan data, wherein said extracted financial plan data is associated with a plurality of plan participants;
   converting said extracted financial plan data into converted financial plan data having a second format compatible with the second computerized system;
   transmitting and loading said converted financial plan data into a data storage of the second computerized system thereby creating a second financial plan;
   verifying that said selected financial plan corresponds to said second financial plan;
   activating said second financial plan in the second computerized system and deactivating said selected financial plan in the first computerized system; and
   migrating and loading to said data storage in the second computerized system pending transactions that would have affected said predetermined financial plan data in the first computerized system and that were initiated prior to activation of said second financial plan;
   providing continuous and uninterrupted access to a user to at least one of said predetermined financial plan data and said converted financial plan data; and
   providing continuous and uninterrupted access to financial plan functions associated with said selected financial plan, wherein said financial plan functions comprise initiating financial transactions, canceling financial transactions, modifying financial transactions, initiating financial fund transfers, canceling financial fund transfers, modifying financial fund transfers, purchasing financial securities, selling financial securities, producing financial plan reports, and executing financial analysis.

2. The method of claim 1, wherein said transmitting and loading said converted financial plan data into a data storage of the second computerized system is carried out by transmitting said converted financial plan data to a temporary data storage in the second computerized system and then loading said converted financial plan data from said temporary data storage into a data storage of the second computerized system.

3. The method of claim 2, wherein said loading said converted financial plan data from said temporary data storage into said data storage of the second computerized system is accomplished by executing a bulk copy program that loads all or a majority of said converted financial plan data into said data storage.

4. The method of claim 1, further comprising moving said selected financial plan to a data storage in said first computerized system and designating said selected financial plan a read-only plan.

5. A method of migrating a financial plan from a first computerized system to a second computerized system comprising:
   extracting predetermined financial plan data from a selected financial plan in the first computerized system to create extracted financial plan data, wherein said selected financial plan is associated with a plurality of plan participants;
   converting said extracted financial plan data into converted financial plan data having a second format compatible with the second computerized system;
   transmitting said converted financial plan data to a temporary data storage in the second computerized system;
   loading said converted financial plan data from said temporary data storage into a data storage of the second computerized system thereby creating a second financial plan;
   verifying that said selected financial plan corresponds to said second financial plan;
   activating said second financial plan in the second computerized system and deactivating said selected financial plan in the first computerized system; and
   migrating and loading to said data storage in the second computerized system pending transactions that would have affected said predetermined financial plan data in the first computerized system and that were initiated prior to activation of said second financial plan;
   providing continuous and uninterrupted access to a user to at least one of said predetermined financial plan data and said converted financial plan data; and
   providing continuous and uninterrupted access to financial plan functions associated with said selected financial plan, wherein said financial plan functions comprise initiating financial transactions, canceling financial transactions, modifying financial transactions, initiating financial fund transfers, canceling financial fund transfers, modifying financial fund transfers, purchasing financial securities, selling financial securities, producing financial plan reports, and executing financial analysis.

6. The method of claim 1, further comprising converting a financial data subset of said predetermined financial plan data from a first financial representation to a second financial representation prior to converting said extracted predetermined financial plan data into said converted financial plan data with said second format.

7. The method of claim 1, further comprising moving said selected financial plan from a data storage in said first computerized system to a staging data storage in said first computerized system prior to extracting said predetermined financial plan data from said selected financial plan.

8. The method of claim 5, further comprising verifying that said converted financial plan data loaded into said data storage of the second computerized system corresponds to said extracted financial plan data; and correcting said converted financial plan data in response to said converted financial plan data in the second computerized system not correctly corresponding to said extracted predetermined financial plan data in the first computerized system.

9. The method of claim 5, wherein said loading said converted financial plan data from said temporary data storage into said data storage of the second computerized system is accomplished by executing a bulk copy program that loads all or a majority of said converted financial plan data into said data storage.

10. The method of claim 5, further comprising moving said selected financial plan to a data storage in said first computerized system and designating said selected financial plan a read-only plan.

11. The method of claim 5, further comprising the verifying that said converted financial plan data loaded into said data storage of the second computerized system corresponds to said extracted financial plan data; and correcting said converted financial plan data in response to said converted financial plan data in the second computerized system not correctly corresponding to said extracted predetermined financial plan data in the first computerized system.

12. The method of claim 5, further comprising the step of converting a financial data subset of said predetermined financial plan data from a first financial representation to a second financial representation prior to converting said extracted predetermined financial plan data into said converted financial plan data with said second format.

13. The method of claim 5, further comprising the step of moving said selected financial plan from a data storage in said first computerized system to a staging data storage in said first computerized system prior to extracting said predetermined financial plan data from said selected financial plan.

14. The method of claim 5, wherein providing continuous and uninterrupted client and participant access further comprises providing access to said pending transactions.

15. The method of claim 14, wherein said extracted financial plan data comprises extracted predetermined financial plan data.

16. The method of claim 15, further comprising converting a financial data subset of said extracted predetermined financial plan data from a first financial representation to a second financial representation.

17. The method of claim 16, further comprising converting said extracted predetermined financial plan data, including said financial data subset with said second financial representation, into said converted financial plan data having said second format compatible with the second computerized system.

18. The method of claim 14, wherein said first computerized system is a first computerized record keeping system and said second computerized system is a second computerized record keeping system.

19. The method of claim 18, further comprising moving a said selected financial plan from a first data storage to a staging data storage in said first computerized record keeping system.

20. The method of claim 19, further comprising extracting said predetermined financial plan data from said selected financial plan in said staging data storage of said first computerized record keeping system.

21. The method of claim 20, further comprising converting a financial data subset of said extracted predetermined financial plan data from a first financial representation to a second financial representation.

22. The method of claim 21, further comprising converting said extracted predetermined financial plan data, including said financial data subset with said second financial representation, into said converted financial plan data having a second format compatible with the second computerized record keeping system.

23. The method of claim 22, further comprising executing post-import comparisons and auto-reconciliation logic to verify that said converted financial plan data loaded into the data storage of the second computerized record keeping system corresponds to said predetermined financial plan data in the selected financial plan in the first computerized record keeping system, and correcting converted financial plan data in response to said converted financial plan data in the second computerized record keeping system not correctly corresponding to the extracted predetermined financial plan data in the first computerized record keeping system, whereby the migration of the selected financial plan from the first computerized record keeping system to the second computerized record keeping system is accomplished without a blackout period.

* * * * *